United States Patent
Matsumoto et al.

(10) Patent No.: US 8,014,632 B2
(45) Date of Patent: Sep. 6, 2011

(54) SUPER-RESOLUTION DEVICE AND METHOD

(75) Inventors: Nobuyuki Matsumoto, Tokyo (JP);
Takashi Ida, Kanagawa-ken (JP);
Hidenori Takeshima, Kanagawa-ken (JP); Yasunori Taguchi, Kanagawa-ken (JP); Kenzo Isogawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1025 days.

(21) Appl. No.: 11/828,397

(22) Filed: Jul. 26, 2007

(65) Prior Publication Data

US 2008/0107356 A1    May 8, 2008

(30) Foreign Application Priority Data

Oct. 10, 2006    (JP) .................................. 2006-276128

(51) Int. Cl.
*G06K 9/32* (2006.01)
(52) U.S. Cl. ........................................ 382/299; 382/300
(58) Field of Classification Search ........... 382/299–300
See application file for complete search history.

(56) References Cited

U.S. PATENT DOCUMENTS

| | | | | |
|---|---|---|---|---|
| 4,238,780 A * | 12/1980 | Doemens | ...................... | 382/151 |
| 5,943,441 A * | 8/1999 | Michael | ........................ | 382/199 |
| 5,987,172 A * | 11/1999 | Michael | ........................ | 382/199 |
| 6,057,855 A * | 5/2000 | Barkans | ........................ | 345/629 |
| 6,269,175 B1 * | 7/2001 | Hanna et al. | ................... | 382/107 |
| 6,650,704 B1 * | 11/2003 | Carlson et al. | ........... | 375/240.01 |
| 6,697,660 B1 * | 2/2004 | Robinson | ....................... | 600/409 |
| 6,766,067 B2 * | 7/2004 | Freeman et al. | ............... | 382/299 |
| 6,920,249 B2 * | 7/2005 | Rinn et al. | ..................... | 382/199 |
| 7,715,658 B2 * | 5/2010 | Cho et al. | ...................... | 382/299 |
| 2002/0051572 A1 | 5/2002 | Matsumoto et al. | | |
| 2002/0172434 A1 * | 11/2002 | Freeman et al. | ............... | 382/299 |
| 2005/0129328 A1 * | 6/2005 | Saber et al. | .................... | 382/269 |
| 2005/0219642 A1 * | 10/2005 | Yachida et al. | ............... | 358/448 |
| 2006/0188160 A1 | 8/2006 | Matsumoto et al. | | |
| 2006/0290950 A1 * | 12/2006 | Platt et al. | ...................... | 358/1.2 |
| 2007/0046785 A1 | 3/2007 | Matsumoto et al. | | |

(Continued)

FOREIGN PATENT DOCUMENTS

JP    2000-188680    7/2000

OTHER PUBLICATIONS

U.S. Appl. No. 12/397,747, filed Mar. 4, 2009, Matsumoto et al.

(Continued)

*Primary Examiner* — Jason M Repko
*Assistant Examiner* — Gandhi Thirugnanam
(74) *Attorney, Agent, or Firm* — Oblon, Spivak, McClelland, Maier & Neustadt, L.L.P.

(57) ABSTRACT

A super-resolution device and method for setting at least one of a plurality of pixels included in image data as target pixels, the image data including pixels arranged in a screen and pixel values representing brightness, an area including the target pixel and peripheral pixels as a target area, and an area for searching pixel value change patterns in the target pixel area; calculating a difference between a first change pattern and second change pattern; comparing a difference between the first and second change patterns; calculating a pixel value of a super-resolution image having a number of pixels larger than a number of pixels included in the image data on the basis of a decimal-accuracy-vector, an extrapolated vector, and pixel values obtained from the image data.

6 Claims, 20 Drawing Sheets

U.S. PATENT DOCUMENTS

2008/0069438 A1* 3/2008 Winn et al. .................. 382/160
2008/0107356 A1* 5/2008 Matsumoto et al. .......... 382/299
2008/0267533 A1* 10/2008 Ida et al. ...................... 382/299
2009/0116732 A1* 5/2009 Zhou et al. ................... 382/154

OTHER PUBLICATIONS

U.S. Appl. No. 12/408,918, filed Mar. 23, 2009, Takeshima et al.
U.S. Appl. No. 12/048,925, filed Mar. 14, 2008, Matsumoto et al.
Park Sung Cheol, et al. "Super-Resolution Image Reconstruction: A Tehcnical Overview," IEEE Signal Processing Magazine USA. pp. 21-36, May 2003.
U.S. Appl. No. 11/558,219, filed Nov. 9, 2006, Ida et al.
U.S. Appl. No. 11/677,719, filed Feb. 22, 2007, Taguchi et al.
U.S. Appl. No. 11/695,820, filed Apr. 3, 2007, Taguchi et al.
U.S. Appl. No. 12/233,030, filed Sep. 18, 2008, Takeshima et al.
U.S. Appl. No. 12/233,155, filed Sep. 18, 2008, Taguchi et al.
U.S. Appl. No. 12/234,164, filed Sep. 19, 2008, Takeshima et al.
U.S. Appl. No. 12/234,111, filed Sep. 19, 2008, Takeshima et al.
U.S. Appl. No. 11/695,820, filed Apr. 3, 2007, Taguchi, et al.
U.S. Appl. No. 12/397,747, filed Mar. 4, 2009, Matsumoto, et al.
U.S. Appl. No. 12/408,918, filed Mar. 23, 2009, Takeshima, et al.

* cited by examiner

SUPER-RESOLUTION DEVICE AND METHOD

CROSS-REFERENCE TO RELATED APPLICATIONS

This application is based upon and claims the benefit of priority from the prior Japanese Patent Application No. 2006-276128, filed Oct. 10, 2006, the entire contents of which are incorporated herein by reference.

BACKGROUND OF THE INVENTION

1. Field of the Invention

The present invention relates to a super-resolution device and method.

2. Description of the Related Art

TVs or displays having a large number of pixels and high resolution are now in widespread use. These TVs or the displays convert a number of pixels in the image data into a number of pixels of a panel when displaying an image. In the conversion of super-resolution for increasing the number of pixels, a multiple frame deterioration reverse conversion method is conventionally used for obtaining an image sharper than what is possible with a conventional linear interpolation method (for example, see U.S. Pat. No. 6,285,804, S. Park, et al. "Super resolution Image Reconstruction: A Technical Overview," IEEE Signal Processing Magazine, USA, IEEE May 2003, p. 21-36), the contents of which are incorporated herein by reference).

Taking advantage of the fact that the photographic subject which comes out in a reference frame also comes out on another frame, the multiple frame deterioration reverse conversion method detects the movement of the photographic subject with a high degree of accuracy at a pixel interval or lower and obtains a plurality of sample values in which the position is minutely shifted with respect to an identical local position of a photographic subject.

In the multiple frame deterioration reverse conversion method, a number of low-resolution images are necessary to obtain a sufficient number of sample values, and hence the amount of memory increases. There is also a problem that it is necessary to obtain the relation of a number of corresponding points by a search process of block matching, and hence the amount of computation increases.

SUMMARY OF THE INVENTION

In view of such circumstances, it is an object of the invention to provide a super-resolution device and method for obtaining a sharp super-resolution image with small amount of memory and computation.

In order to solve the above-described object, an aspect of the invention is a super-resolution device including:

a candidate area setting unit that sets at least one of a plurality of pixels included in an image data as a target pixel, the image data including the plurality of pixels arranged in a screen and pixel values representing the brightness of the pixels, sets an area including the target pixel and pixels in the periphery of the target pixel as target pixel area, and sets a search area for searching a plurality of change patterns of the pixel values of the pixels included in the target pixel area within the screen;

a matching difference calculating unit that calculates differences between the change pattern of the pixel values of the pixels included in the target pixel area and the change pattern of the pixel values of the pixels included in the area, the pixels in the area including the searched pixel in the search area and the pixels in the periphery of the searched pixels;

a difference comparing unit that compares differences of the change pattern of the respective pixels in the search area calculated by the matching difference calculating unit to obtain a first pixel position with the minimum difference and a second pixel position in the periphery of the first pixel position with a second difference thereof;

a memory that stores the first pixel position and a first difference thereof, the second pixel position and a second difference thereof calculated by the difference comparing unit;

a decimal-accuracy-vector calculating unit that calculates a position with the minimum difference in the search area with a decimal accuracy on the basis of the first pixel position and the first difference thereof and the second pixel position and the second difference thereof stored in the memory, and calculates a decimal-accuracy-vector starting from the target pixel and terminating at the position with the minimum difference;

an extrapolated vector calculating unit that calculates an extrapolated vector of the decimal-accuracy-vector terminating at the pixel on the screen which is not included in the search area using the decimal-accuracy-vector; and a super-resolution pixel value calculating unit that calculates a pixel value of a super-resolution image having the number of pixels larger than the number of pixels included in the image data on the basis of the decimal-accuracy-vector, the extrapolated vector, and the pixel values obtained from the image data.

DESCRIPTION OF THE PREFERRED EMBODIMENTS

Figure 1:
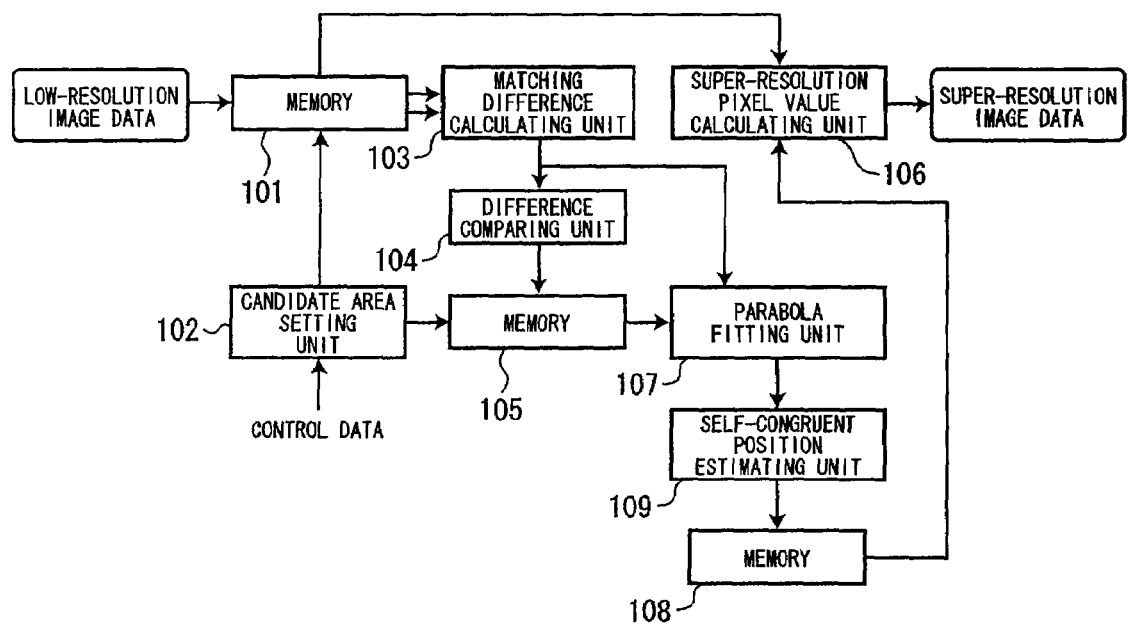
FIG. 1 is a block diagram of a super-resolution device according to an embodiment of the invention.

Referring now to the drawings, a super-resolution device and method according to embodiments of the invention will be described.

The invention is not limited to the embodiments shown below, and may be implemented by selecting or modifying in various manner.

FIG. 1 is a block diagram of a super-resolution device according to an embodiment of the invention.

As shown in FIG. 1, the super-resolution device includes a memory 101, a candidate area setting unit 102, a matching difference calculating unit 103, a difference comparing unit 104, a memory 105, a super-resolution pixel value calculating unit 106, a parabola fitting unit 107, a memory 108, and a self-congruent position estimating unit 109. In this specification, the term "self-congruent" means that the brightness changing pattern of the pixels are similar in the same frame. The term "self-congruent position" is the position of the self-congruent expressed by vector.

The memory 101 acquires a low-resolution image data and stores the same. The low-resolution image data may be a movie or a still image, and is an image data obtained by arranging a plurality of pixels in a screen and expressing the brightness of the pixels in pixel values. In this embodiment, the low-resolution image data is acquired from an image source, that is, from an image data generating unit (not shown) such as a camera or a TV. More specifically, the low-resolution image data is an image data taken by a camera or an image data received by the TV.

The candidate area setting unit 102 determines at least one of the plurality of pixels of the low-resolution image data as a target pixel and an area including the target pixel and pixels in the periphery of the target pixel as a target pixel area, and sets a search area for searching a plurality of change patterns of the pixel values of the pixels included in the target pixel area in the screen.

Then, the candidate area setting unit 102 generates signals which indicate the target pixel, the target area, and the search area, and outputs these signals to the memory 101 and the memory 105.

Based on the signals which indicate the target pixel, the target area, and the search area, the memory 101 outputs an image data of the target pixel area including the target pixels and the image data in the search area from the low-resolution pixel image data to the matching difference calculating unit 103. The memory 101 supplies a low-resolution image data to the super-resolution pixel value calculating unit 106 one by one.

The matching difference calculating unit 103 calculates a difference between a change pattern of the pixel values of the pixels included in the target pixel area and the change pattern of the pixel values of the pixels included in the search area, the pixels in the area including the searched pixels in the search area and the pixels in the periphery of the searched pixels.

The matching difference calculating unit 103 calculates a difference between the image data within the target pixel area and the image data within the search area. The difference is calculated, for example, by sum of absolute distance or sum of square distance of the respective pixel values. The image data of the target pixel area may be, for example, data of a target block. The matching difference calculating unit 103 changes the image portion in the search area whose difference is to be calculated in sequence and obtains a difference with respect to the image data of the image portion in the target pixel area whose difference is to be calculated.

The difference comparing unit 104 calculates the position of a pixel which has the smallest difference out of the plurality of differences in the search area calculated by the matching difference calculating unit 103.

The memory 105 acquires positional information from the candidate area setting unit 102, and stores the position of the pixel having the smallest difference calculated by the difference comparing unit 104 and the matching difference, and the positions of pixels around the position of the pixel having the smallest difference and the matching difference at these positions.

The parabola fitting unit 107 applies symmetric function on the basis of the position of the pixel having the smallest difference and the matching difference, and the positions of the pixels around the position of the pixel having the smallest difference and the matching difference at these positions store in the memory 105, calculates a position having the smallest matching difference with a decimal accuracy, and determines the calculated position as a self-congruent position. At least one self-congruent position is obtained for one target pixel. Detailed description of the parabola fitting unit 107 will be given later.

The self-congruent position estimating unit 109 estimates and calculates at least one self-congruent position on the basis of the amount of change of the self-congruent position calculated by the parabola fitting unit 107.

The memory 108 stores information on the self-congruent position obtained by the parabola fitting unit 107 and the self-congruent position estimating unit 109.

After having obtained the self-congruent position for the predetermined pixel of the low-resolution image, the super-resolution pixel value calculating unit 106 obtains image data of the low-resolution image from the memory 101 and obtains the self-congruent position from the memory 108, establishes conditional expressions simultaneously using the self-congruent position for each pixel data of the low-resolution image, obtains a solution to determine the pixel value of the super-resolution image, and outputs the pixel value data.

Subsequently, referring to FIG. 2, the super-resolution device in a case in which an over sampling method is used instead of the parabola fitting method will be described.

Figure 2:
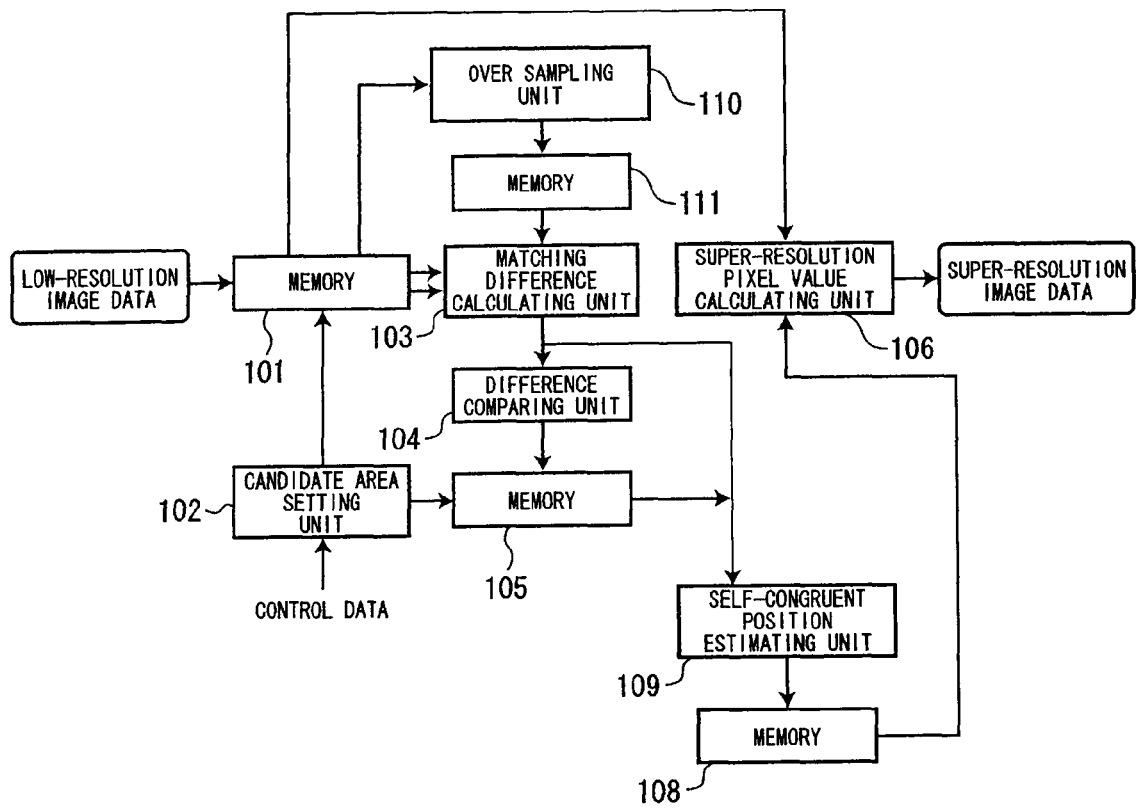
FIG. 2 is a block diagram of a super-resolution device according to the embodiment of the invention.

The super-resolution device in FIG. 2 is configured in such a manner that the parabola fitting unit 107 is removed from the configuration in FIG. 1, and an over sampling unit 110 and a memory 111 are added instead.

The candidate area setting unit 102 sets at least one of the plurality of pixels included in the image data as the target pixel, the image data including the plurality of pixels arranged in a screen and pixel values representing the brightness of the pixels, sets an area including the target pixel and the pixels in the periphery of the target pixel as the target pixel area, and sets a search area for searching a plurality of patterns of change of the pixel values of the pixels included in the target pixel area.

The over-sampling unit 110 interpolates another pixel between the pixels of the image data whose target pixel area and the search area are set to generate an interpolated image data. In other words, the over-sampling unit 110 increases the data amount of the low-resolution data by depending on the intervals of difference calculation.

The memory 111 stores data sampled by the over-sampling unit 110 temporarily and supplies the data to the matching difference calculating unit 103.

The matching difference calculating unit 103 calculates a difference between the change pattern of the pixel values of the pixels included in the target pixel area and the change pattern of the pixel values of the pixels included in an area including the searched pixel in the search area and the pixels in the periphery of the searched pixel.

The difference comparing unit 104 calculates the pixel position having the smallest difference out of the plurality of differences in the search area calculated by the matching difference calculating unit 103.

The memory 105 acquires positional information about the calculated pixel position having the smallest matching difference calculated by the difference comparing unit 104 from the candidate area setting unit 102, and stores the integral-accuracy-vector starting from the target pixel and terminating at the pixel having the smallest matching difference.

The self-congruent position estimating unit 109 estimates and calculates one or more self-congruent positions on the basis of the difference calculated in the matching difference calculating unit 103 and the change amount of the integral accuracy vector calculated by the memory 105.

The memory 108 stores information of the self-congruent position obtained by the self-congruent position estimating unit 109.

After having obtained the self-congruent position of the predetermined pixels of the low-resolution image, the super-resolution pixel value calculating unit 106 obtains the pixel data of the low resolution image from the memory 101 and the self-congruent position from the memory 108, establishes conditional expressions simultaneously using the self-congruent position for each pixel data of the low-resolution image, obtains a solution to determine the pixel value of the super-resolution image, and outputs the pixel value data.

Figure 3:
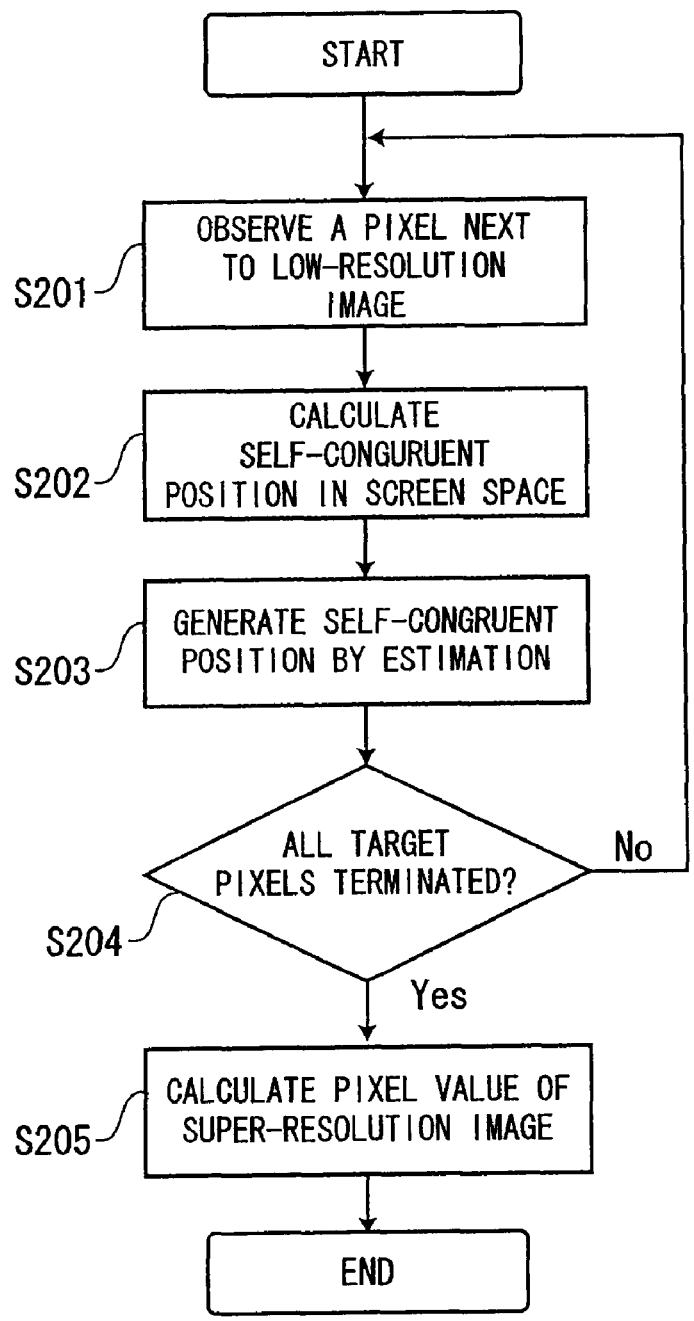
FIG. 3 is a flowchart showing an example of the operation of the super-resolution device according to the embodiment of the invention.

Referring now to FIG. 3, an embodiment of the operation of super-resolution device described in conjunction with FIG. 1 will be described. The image may be referred to as a frame in the following description.

As shown in FIG. 3, in Step S201, the candidate area setting unit 102 sets a pixel of the low-resolution image data as a target pixel in a predetermined sequence. The sequence is, in the case of a still image, a raster sequence, for example, rightward from the upper left pixel in the screen, downward from the upper row.

Subsequently, in Step S202, the matching difference calculating unit 103, the difference comparing unit 104 and the parabola fitting unit 107 detect a point corresponding to the target pixel (self-congruent position) in a screen space of the low-resolution image data.

Subsequently, in Step S203, the self-congruent position estimating unit 109 estimates and generates a new self-congruent position on the basis of the change amount of the self-congruent position calculated by the parabola fitting unit 107.

Subsequently, in Step S204, the matching difference calculating unit 103 determines whether or not the self-congruent position is obtained for each pixel of the low-resolution image data used for super-resolution. If No, the procedure goes back to Step S201, in which the next pixel is processed, and if Yes, the procedure goes to Step S205.

Subsequently, in Step S205, the super-resolution pixel value calculating unit 106 calculates a pixel value of the super-resolution image data corresponding to the low-resolution image data using the pixel value of the low-resolution image data and the detected self-congruent position and terminates the process. Calculation of the pixel value of the super-resolution image data will be described referring to FIG. 16.

Figure 4:
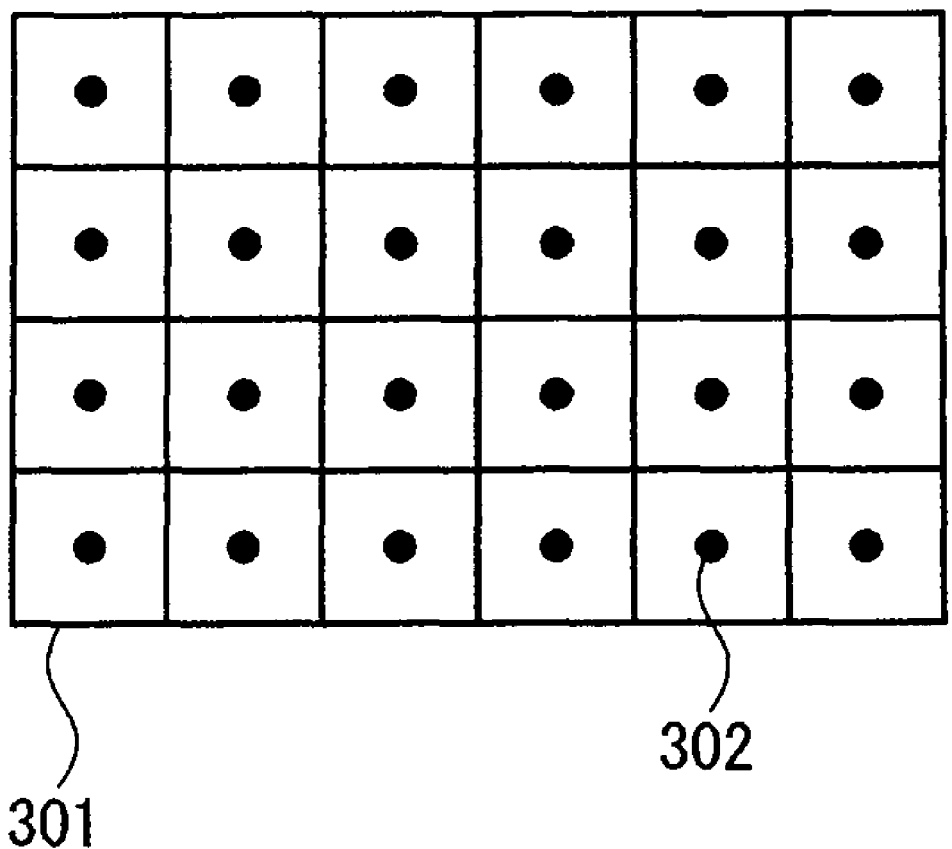
FIG. 4 is a drawing showing a positional relation between a screen and pixels of a low-resolution image data.
Figure 5:
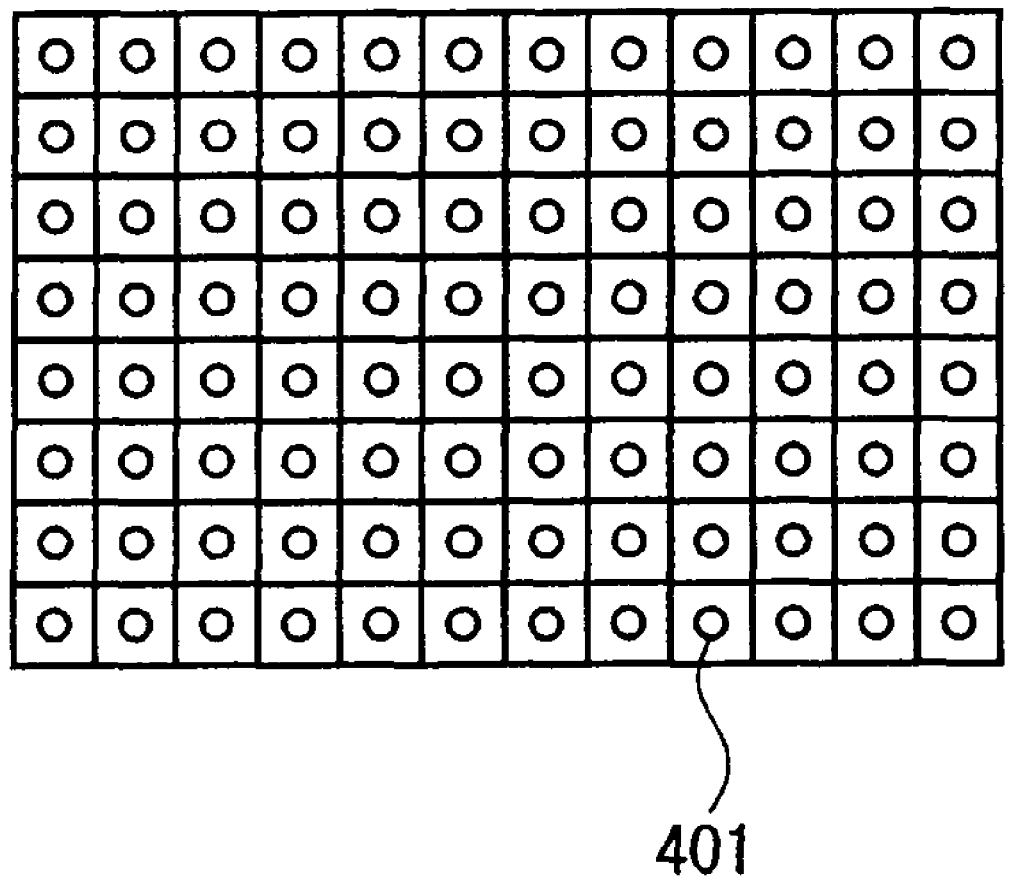
FIG. 5 is a drawing showing a super-resolution image obtained by super-resolution on the image shown in FIG. 4.

FIG. 4 shows a positional relation between a screen 301 and a pixel 302 of the low-resolution image.

The image basically has brightness which is continuously distributed in the screen space. However, in the case of the digital image data handled here, pixels are arranged in the screen space as discrete sample points, and the ambient brightness thereof is represented by the brightness of each pixel by itself.

FIG. 4 shows a state in which the screen is divided into twenty-four squares arranged to have six in the lateral direction and four in the vertical direction, and twenty-four pixels 301 are arranged at the centers thereof as the sample points 302.

Subsequently, a state in which the super-resolution is applied to the screen shown in FIG. 4 by double in the lateral direction and double in the vertical direction is shown. Sample points 401 of the pixels in the super-resolution image data are indicated by hollow circles. In this manner, the interval of the sample points 401 of the pixels is half of the low-resolution image data.

Figure 6:
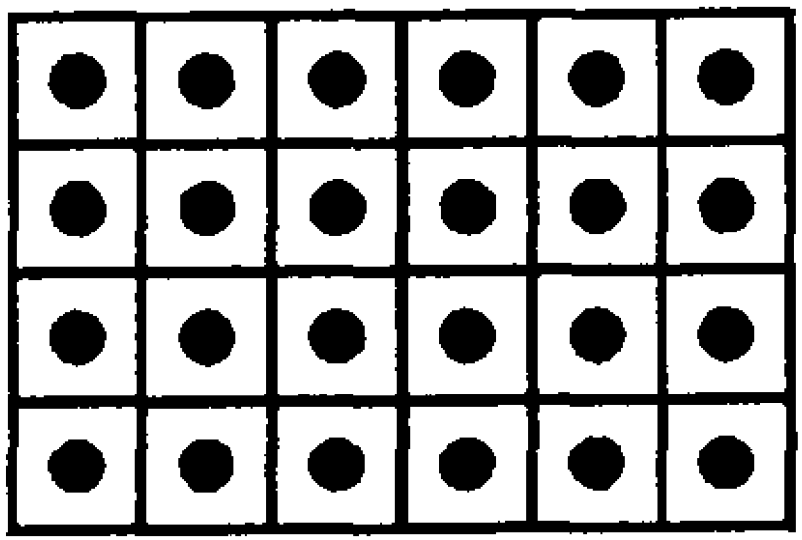
FIG. 6 is a drawing showing a low-resolution image obtained by matching the pixel interval of the image in FIG. 4 with the pixel interval of the image in FIG. 5.

FIG. 6 shows the pixels of the original low-resolution image data at the interval which is the same as that of the super-resolution image data. In this case, the size of the low-resolution image data is smaller than that of the super-resolution image data.

In this manner, when the size of the screen of the low-resolution image data is adjusted to match the screen of the super-resolution image data, the interval of the sample points of the pixels increases, and when the interval of the sample points of the pixels is adjusted to match that of the super-resolution image data, the size of the screen is reduced. However, these phenomena represent the same thing, and hence in this specification, the low-resolution image is shown as in FIG. 4 and FIG. 6 as needed for the sake of convenience of description.

Figure 7:
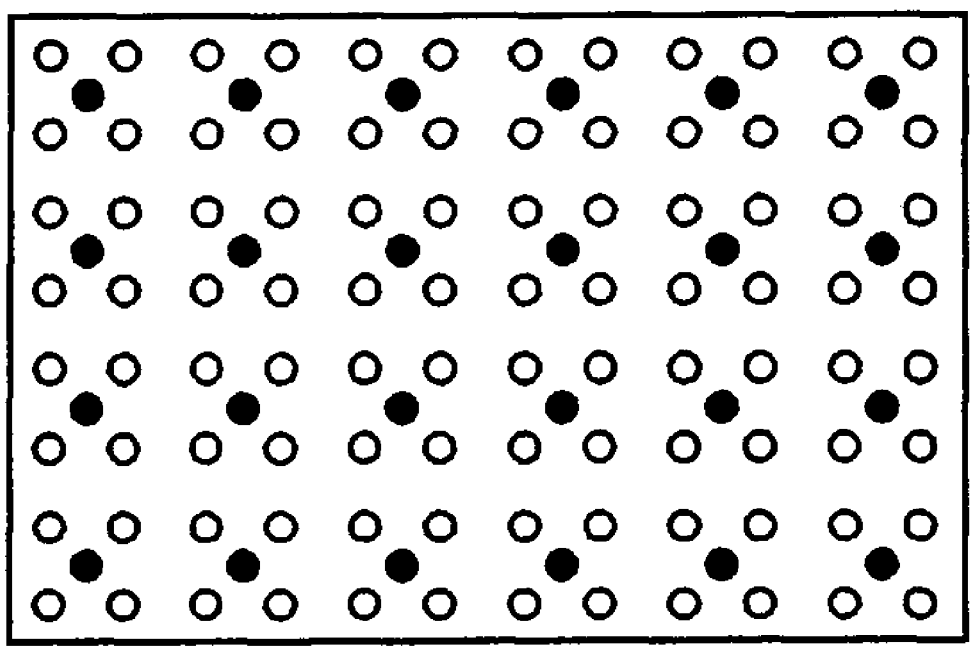
FIG. 7 is a drawing showing a positional relation between the pixels in FIG. 4 and in FIG. 5.

FIG. 7 is a drawing showing the sample points of the pixels in the low-resolution image data with solid circles, and the sample points of the pixels in the super-resolution image data with hollow circles. The process of the super-resolution is to obtain the brightness values of the sample points represented by the hollow circles on the basis of the brightness values provided to the sample points represented by the solid circles.

Subsequently, using FIG. 8 to FIG. 11, Step S202 described in FIG. 3 will be described with a detailed example.

In the plurality of frames deterioration reverse conversion method in the related art, the super-resolution is performed by increasing the number of sample points in the low-resolution image data by calculating the corresponding identical points among the multiple frames with sub pixel accuracy. In other words, a large number of pixel values obtained by sampling the portions having the same brightness change with different phases are necessary among the multiple frames, and hence a large amount of memory is necessary.

Figure 8:
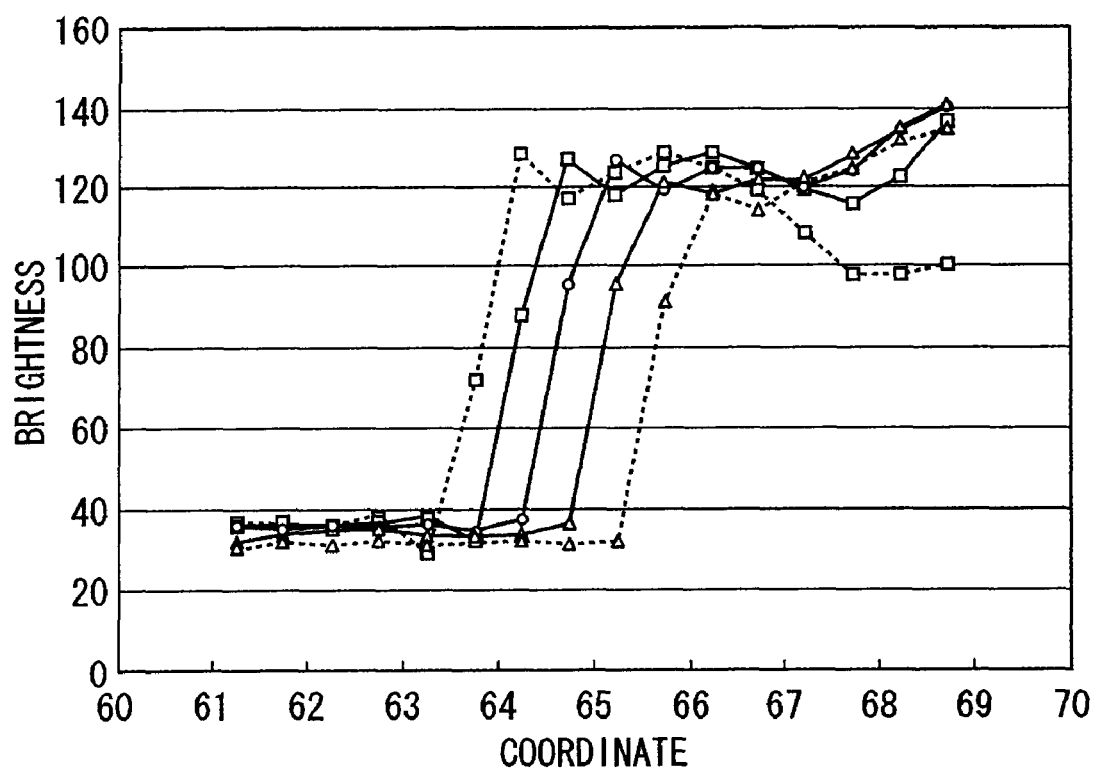
FIG. 8 is a drawing showing a relation between the positional coordinate and the brightness of a photographic data.

FIG. 8 shows data of an actual picture.

The lateral axis represents the lateral coordinate of the pixel and the vertical axis represents the brightness. Five rows of data are represented by different curved lines respectively.

As will be seen, there are portions which demonstrate a very similar brightness change even though the row is different in the same frame. Such a property of the image is referred to as having a self-congruent property in the local pattern, and the self-congruent position existing around a certain target pixel is referred to as a self-congruent position.

In the invention, since the super-resolution is achieved using the self-congruent property of the photographic subject within the frame, it is not necessary to hold a plurality of low-resolution image data in the memory, and hence the super-resolution is achieved with a small amount of memory.

Figure 9:
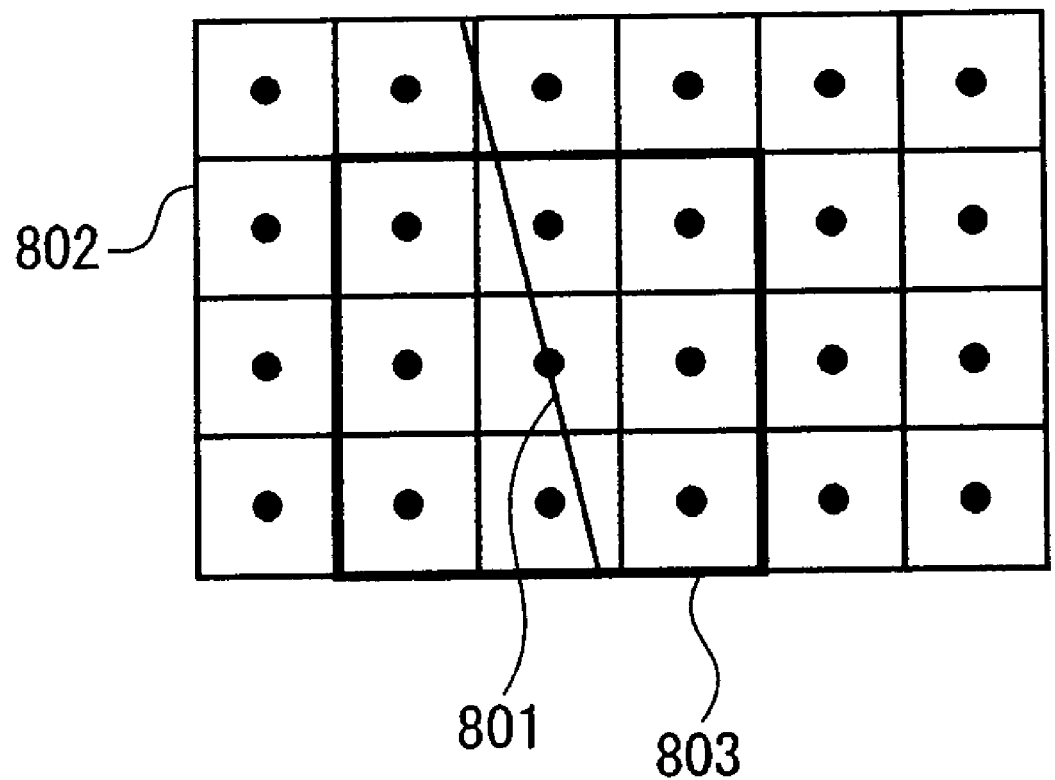
FIG. 9 is a drawing showing a setting of the target pixel and the target image area.

FIG. 9 is a conceptual drawing showing a state in which the candidate area setting unit 102 described in FIG. 1 and FIG. 2 sets the target pixel and the target area.

As shown in FIG. 9, the candidate area setting unit 102 takes out several square pixels, for example, a square block 803 having 5×5 pixels or 3×3 pixels from a frame 802 with a target pixel 801 placed at the center.

Figure 10:
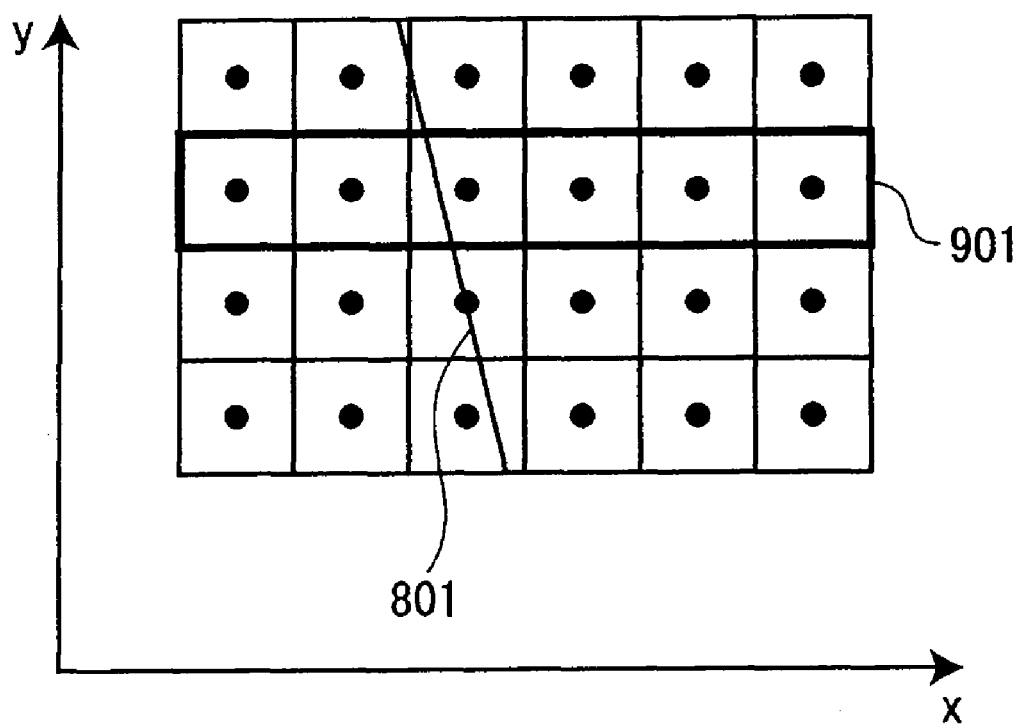
FIG. 10 is a drawing showing the setting of the target pixel and the search area.

FIG. 10 is a conceptual drawing showing a state in which the candidate area setting unit 102 described in FIG. 1 and FIG. 2 sets a search area 901. In this drawing, an example in which the search area is set with six pixels in the x-direction with the y-coordinate fixed. The matching difference calculating unit 103 searches a portion whose change pattern of the pixel value is close to the target image area 803 shown in FIG. 9 for the respective pixels included in the search area 901.

The matching difference among the respective image areas to be calculated by the matching difference calculating unit 103 may be SSD (Sum of Square Distance) which is a sum of square distance among the respective pixel values in the image area or SAD (Sum of Absolute Distance) which is a sum of the absolute distance.

In this case, the search area is set in the x-direction with the y-coordinate fixed. The method of obtaining the sub pixel estimation in this manner is specifically effective when the brightness of the low-resolution image data changes in the lateral direction.

Although not shown in the drawings, a method of fixing the x-coordinate, setting the search area to the y-direction and obtaining the sub pixel estimation is effective when the brightness of the low-resolution image data changes in the vertical direction.

Therefore, a method of setting at least one search area in the lateral direction which is orthogonal to the direction of the edge if it is vertical, and at least one search area in the vertical direction if it is lateral by the candidate area setting unit 102 is effective. In other words, the direction of inclination of the pixel value of the target pixel may be detected to search the self-congruent position in the direction of inclination.

The positional information of the pixels from the candidate area setting unit 102 is called, the matching differences calculated by the matching difference calculating unit 103 are compared to obtain a pixel position with the minimum difference, and the position of the pixel with minimum difference and the matching difference, and the positions of the pixels in the periphery of the pixel with minimum difference and the matching differences at these positions are stored in the memory.

Subsequently, estimation of the sub pixel (with a decimal accuracy) in the preset search area will be described. One of the methods of estimating the sub pixel is a parabola fitting method (for example, see "Signification and Property of Sub pixel Estimation in Image Matching" by Shimizu, Okutomi, the contents of which are incorporated herein by reference).

The parabola fitting method calculates a position with the minimum matching difference with a decimal accuracy from the matching difference between the target pixel area and the candidate image area around the pixel within the preset search area with an integral accuracy.

The matching difference is calculated by shifting the position of the candidate image area in the search area with an integral accuracy, and the matching difference map with an integral accuracy in the search area space is calculated.

Figure 11:
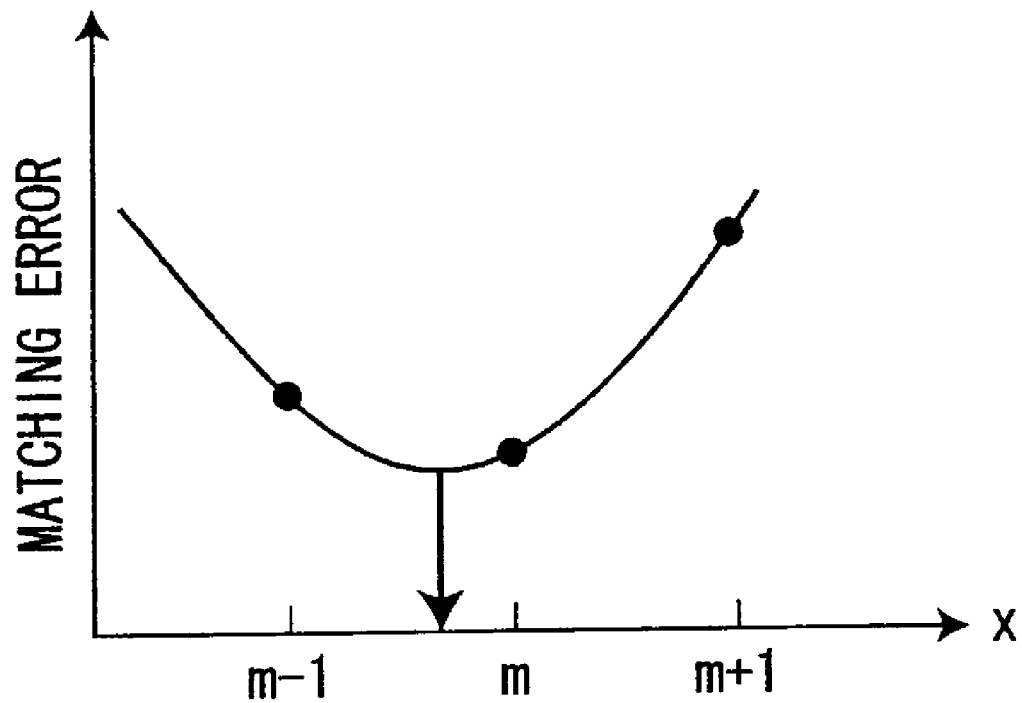
FIG. 11 is a drawing for explaining the parabola fitting method.

FIG. 11 is a graph showing a matching method in the parabola fitting method, in which the lateral axis represents the pixel and the vertical axis represents the matching difference.

As shown in FIG. 11, the positional shift amount at a sub pixel accuracy can be calculated as a position of an apex of a parabola (or a symmetric continuous function) applied to a discrete matching difference map with an integral accuracy by applying the parabola (or the symmetric continuous function) around the amount of positional shift (x=m) with an integral accuracy with the smallest matching difference.

Figure 12:
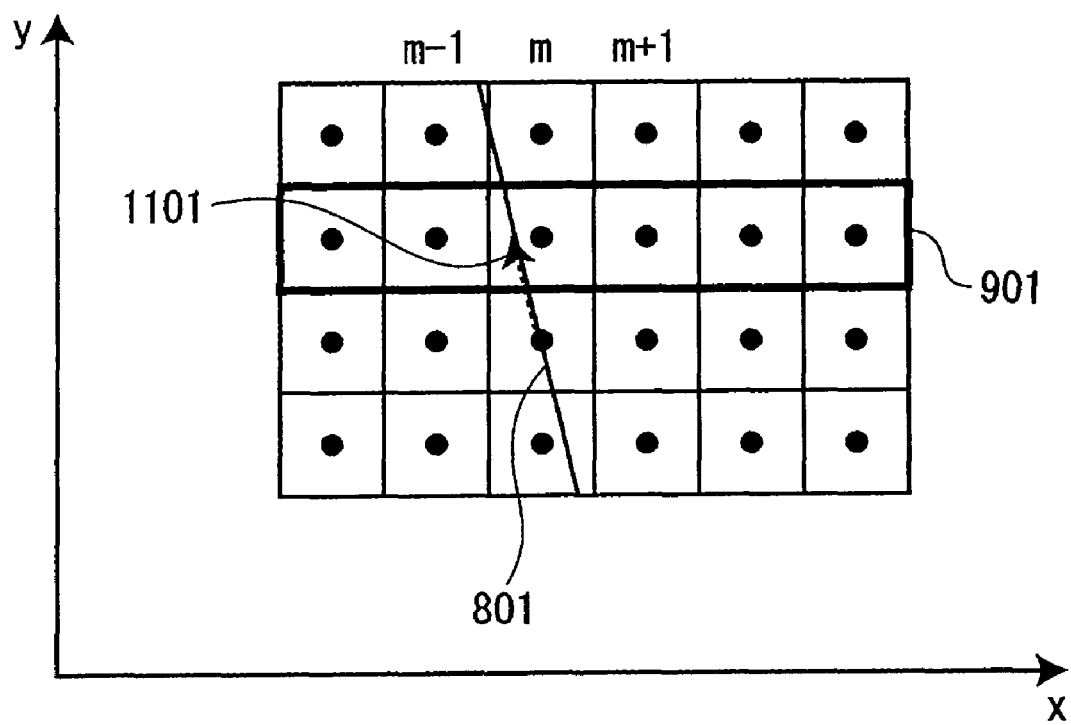
FIG. 12 is a drawing showing calculation of a self-congruent position by a matching processing.

FIG. 12 is a drawing illustrating a state of calculating a vector with a decimal accuracy using the parabola fitting method.

As shown in FIG. 12, a position with the minimum difference is calculated with a decimal accuracy in the search area 901 on the basis of the matching difference calculated at each pixel in the search area 901, and a vector 1101 with a decimal accuracy starting from the target pixel 801 and terminating at this position.

In addition to the parabola fitting method, an isometric fitting as described in "Signification and Property of Sub pixel Estimation in Image Matching" by Shimizu, Okutomi may also be applied.

In the method using the over sampling unit 110 described in conjunction with FIG. 2, the low-resolution image data is enlarged to, for example, double by an enlargement method such as a linear interpolation or a cubic convolution method. When the pixel accuracy is searched in this state, it is equivalent to the calculation of the shift amount with an accuracy of 0.5 pixels in the original low-resolution image data. In this manner, in the over sampling method, it is necessary to double the data to halve the accuracy (the interval to obtain the difference), and to quadruple the same to obtain a quarter accuracy.

Figure 13:
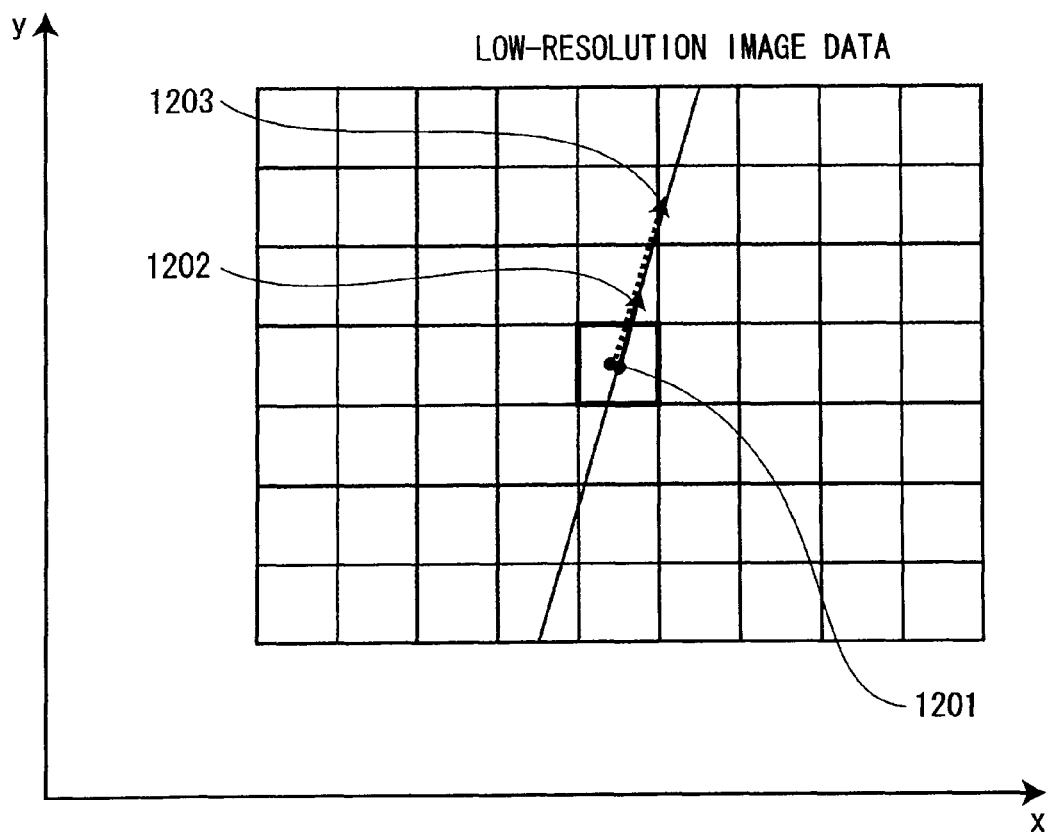
FIG. 13 is a drawing showing generation of the self-congruent position by estimation by extrapolation.
Figure 14:
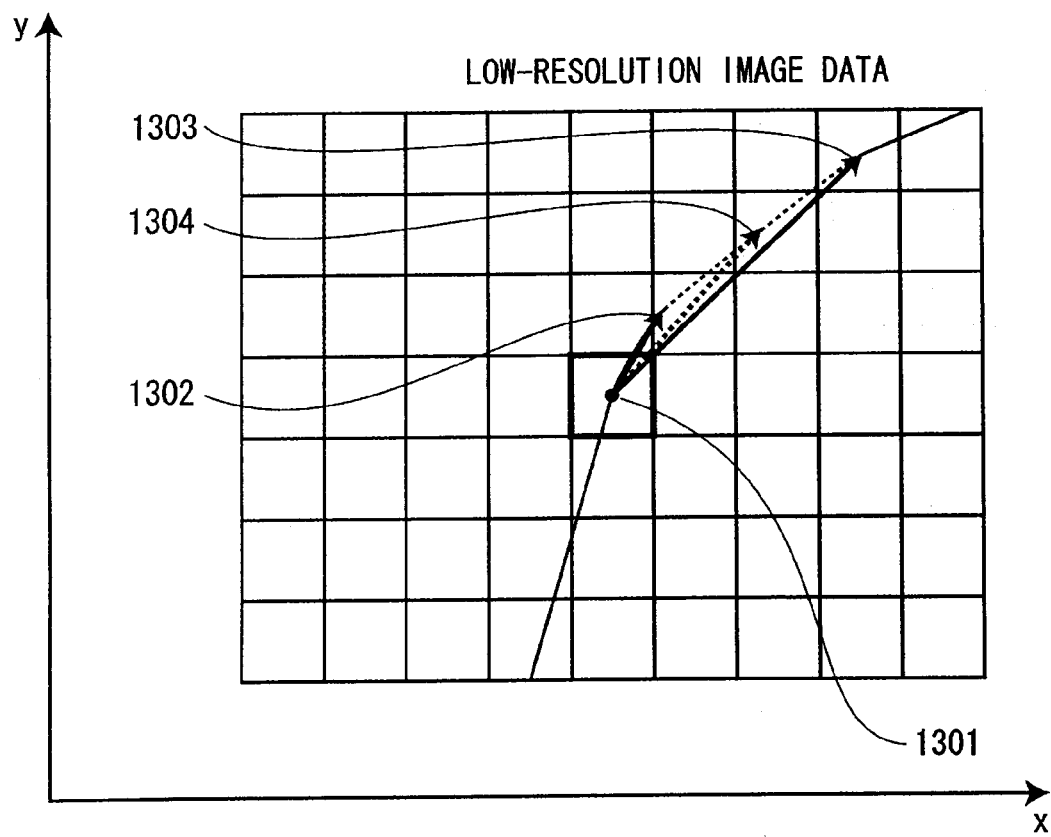
FIG. 14 is a drawing showing generation of the self-congruent position by estimation by interpolation.
Figure 15:
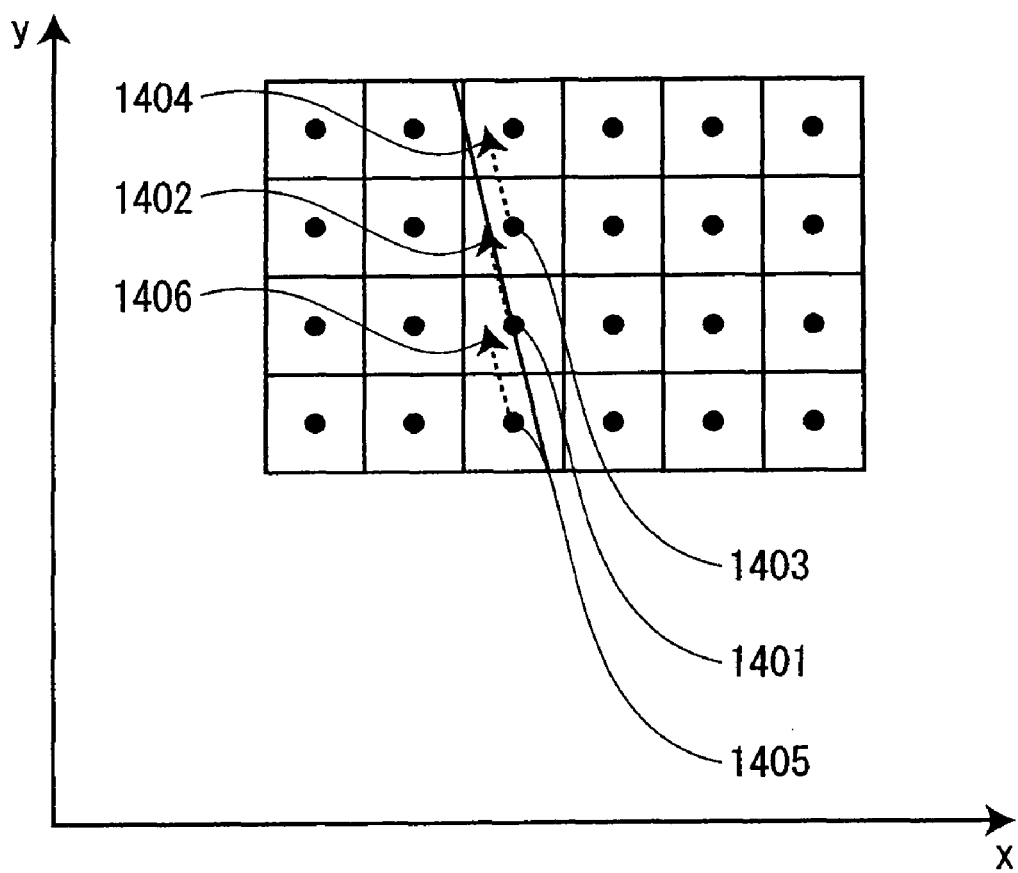
FIG. 15 is a drawing showing generation of the self-congruent position by duplication.

Referring now to FIG. 13 to FIG. 15, generation of the self-congruent position by estimation performed in Step S203 in FIG. 3 will be described.

The self-congruent position calculation performed in Step S202 requires a large amount of processing as it is necessary to execute the calculation of the matching difference between the image areas in the search area by the number of times which corresponds to the number of the self-congruent positions to be obtained. Therefore, in the Step S203, new self-congruent positions are generated with a small amount of processing by estimation by extrapolation, estimation by interpolation and estimation by duplication on the basis of the self-congruent positions calculated in Step S202.

The estimation by extrapolation here means to estimate new self-congruent positions from the search area outside the one or more self-congruent positions calculated by matching.

The estimation by interpolation means to estimate new self-congruent positions from the search area positioned inside the two or more self-congruent positions calculated by the matching.

Estimation by duplication means to estimate the self-congruent position of the target pixel calculated by the matching as the self-congruent positions of the target pixels nearby.

FIG. 13 is a drawing for explaining that the self-congruent positions are generated by the estimation by extrapolation.

As shown in FIG. 13, a self-congruent position 1202 at one line above a target pixel 1201 is calculated by the Step S202 in FIG. 3. The self-congruent position at two lines above can be estimated to be the double the amount of change up to the self-congruent position 1202 at one line above the target pixel 1201 by extrapolation. Reference numeral 1203 designates the self-congruent position at two lines above obtained by estimation by extrapolation.

The estimation by extrapolation may be performed not only by estimating one position from one self-congruent position, but performed by estimating plurality of self-congruent positions. It is also possible to estimate the new self-congruent position at a position at decimal multiple in amount of change as well as the position at integral multiple in amount of change.

In other words, by using the vector 1202 with a decimal accuracy starting from the target pixel and terminating at the position with the minimum difference calculated with a decimal accuracy in the search area by the parabola fitting unit 107 in FIG. 1, or by using the vector 1202 with an integral accuracy obtained by interpolating another pixel between the pixels of the image data in which the target pixel area and the search area are set to generate an interpolated image data, and then calculating the position with the minimum difference by the over sampling unit 110 in FIG. 2, the extrapolated vector 1203 with a decimal accuracy terminating at a pixel on the screen which is not included in the search area is calculated.

FIG. 14 is a drawing for explaining that a self-congruent position is generated by the estimation by interpolation.

As shown in FIG. 14, a self-congruent position 1302 at one line above a target pixel 1301 and a self-congruent position 1303 at three lines above thereof are calculated in Step S202 in FIG. 3. A self-congruent position 1304 at two lines above can be estimated by interpolation as an internally dividing point between the amount of change from the target pixel position 1301 to the self-congruent position 1302 at one line above and the amount of change from the target pixel position 1301 to the self-congruent position 1303 at three lines above.

The estimation by interpolation may estimate not only the single self-congruent position 1304 from the two self-congruent positions 1302, 1303, but also a plurality of self-congruent positions obtained by dividing internally into n equal parts.

In other words, by using the vector 1202 with a decimal accuracy starting from the target pixel and terminating at the position with the minimum difference calculated with a decimal accuracy in the search area by the parabola fitting unit 107 in FIG. 1, or by using the vectors 1302, 1303 with an integral accuracy obtained by interpolating another pixel between the pixels of the image data in which the target pixel area and the search area are set to generate an interpolated image data, and then calculating the position with the minimum difference by the over sampling unit 110 in FIG. 2, the interpolated vector 1304 with a decimal accuracy terminating at a pixel on the screen which is not included in the search area is calculated.

FIG. 15 is a drawing for explaining that a self-congruent position is generated by the estimation by duplication.

As shown in FIG. 15, a self-congruent position 1402 at one line above a target pixel 1401 is calculated by the Step S202 in FIG. 3. By copying the amount of change from the target pixel position 1401 to the self-congruent position 1402, the self-congruent position 1404 at one line above the target pixel 1401 and a self-congruent position 1406 at one line below the target pixel 1401 can be generated.

In other words, by using the vector 1202 with a decimal accuracy starting from the target pixel and terminating at the position with the minimum difference calculated with a decimal accuracy in the search area by the parabola fitting unit 107 in FIG. 1, or by using a vector 1402 with an integral accuracy obtained by interpolating another pixel between the pixels of the image data in which the target pixel area and the search area are set to generate the interpolated image data and then calculating the position with the minimum difference by the over sampling unit 110 in FIG. 2, the congruent vector with the decimal accuracy terminating at a pixel in the screen which is not included in the search area is calculated.

As described above, by estimating the self-congruent position in Step S203 in FIG. 3, the self-congruent position can be calculated with the small amount of processing. In addition, the self-congruent positions can be padded out, so that the image quality can be improved. Furthermore, since the self-congruent position at a position closer to the target pixel such as to generate the self-congruent positions at 0.5 line above and 1.5 line above the self-congruent position at one line above, whereby improvement of the image quality is achieved.

Figure 16:
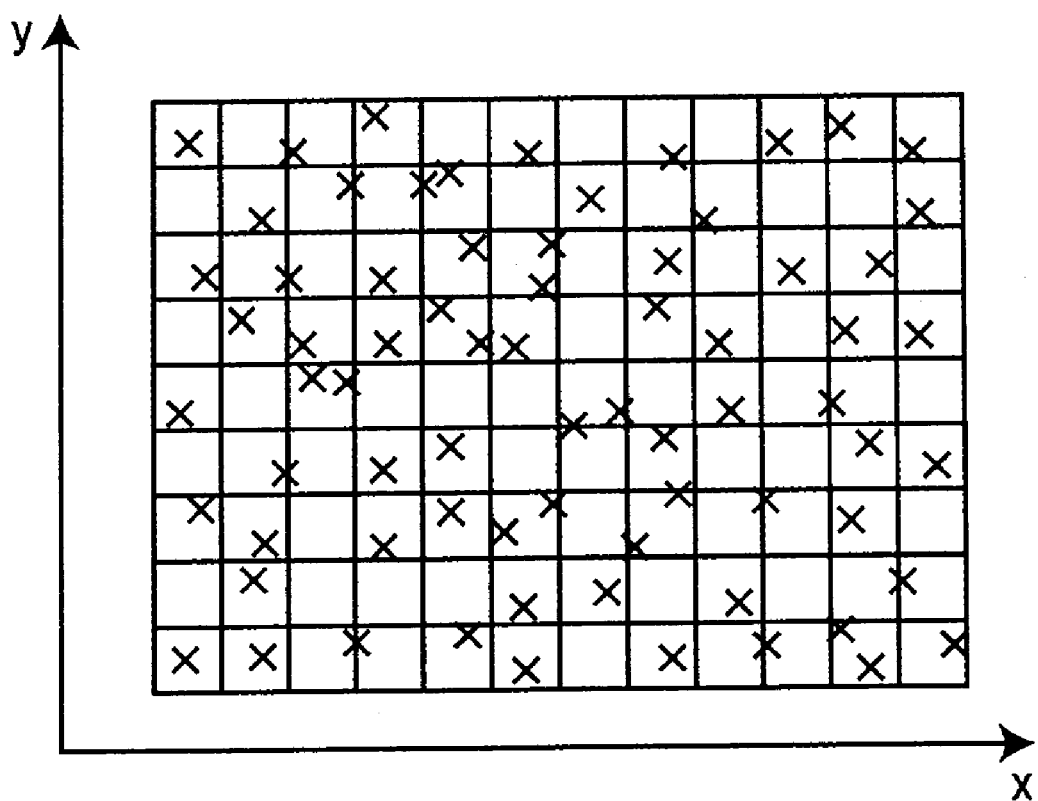
FIG. 16 is a drawing showing a plurality of self-congruent positions calculated in the screen space.

Referring now to FIG. 16, calculation of the pixel value of the super-resolution image data performed in Step S205 in FIG. 3 will be described.

At the timing when the process in Step S204 in FIG. 3 is ended, for example, the self-congruent positions as indicated by cross-signs in FIG. 16 are obtained. In this manner, although there are various manners to obtain the values of pixels arranged in a lattice-like pattern from sample points distributed non-uniformly, for example, when employing a superimposing method (for example, non-uniform interpolation. See S. Park, et. al. "Super-Resolution Image Reconstruction: A Technical Overview" p. 25), the pixel value of the super-resolution image data can be obtained by inspecting the sample values near there, and finding the sample value at the closest position to the pixel of the super-resolution image data and determining the sample value as the pixel value of the super-resolution image data. Alternatively, it is achieved by increasing the weight of the sample values as the distance from the pixel of the super-resolution image data is decreased, and determining the weighted average of the sample values as the pixel value of the super-resolution image data. Further alternatively, an average of sample values which are closer than a certain distance is employed as a pixel value of the super-resolution image data.

Figure 17:
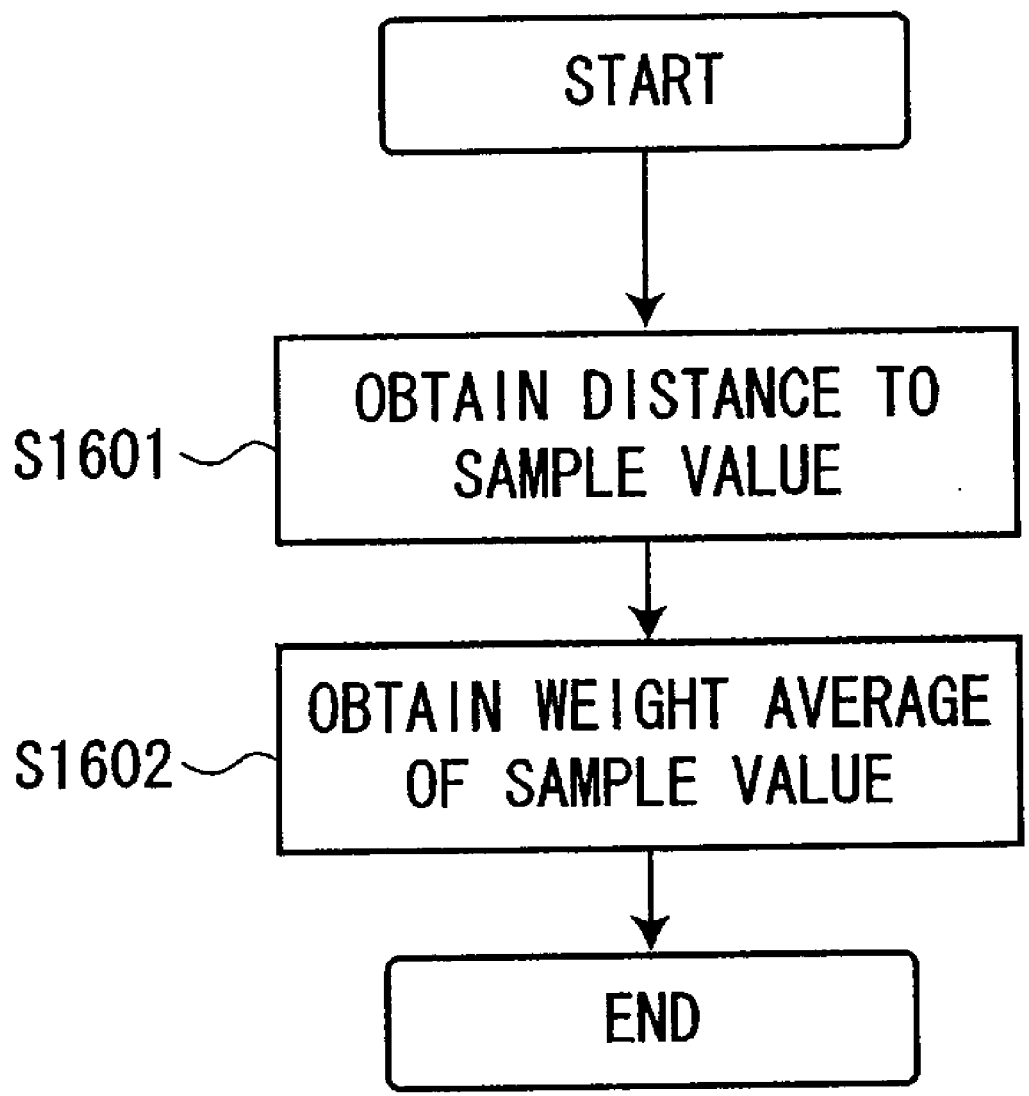
FIG. 17 is a flowchart showing an example of the operation when the pixel value of the super-resolution image is obtained by the superimposing method.

Referring now to FIG. 17, a flowchart for obtaining the pixel value of the super-resolution image data by the superimposing method will be described.

As shown in FIG. 17, in Step S1601, the distances to the respective sample points are obtained for each pixel of the super-resolution image data.

Subsequently, in Step S1602, the respective pixel values are obtained as the weighted average of the sample points. At this time, the closer the distance of the sample values from the respective pixels, the more the weight is increased.

When POCS method (for example, see S. Park, et. al, "Super-Resolution Image Reconstruction: A Technical Overview" p. 29) is used instead of the superimposing method, the process is more complicated, but a sharper image can be obtained.

In the POCS method, an initially estimated super-resolution image is provided to each pixel in the super-resolution image data by a bilinear interpolating method or the cubic convolution method. Then, the estimated super-resolution images when the pixel values of the initially estimated super-resolution image of the super-resolution image data are used at the positions of the respective sample values are calculated.

Figure 18:
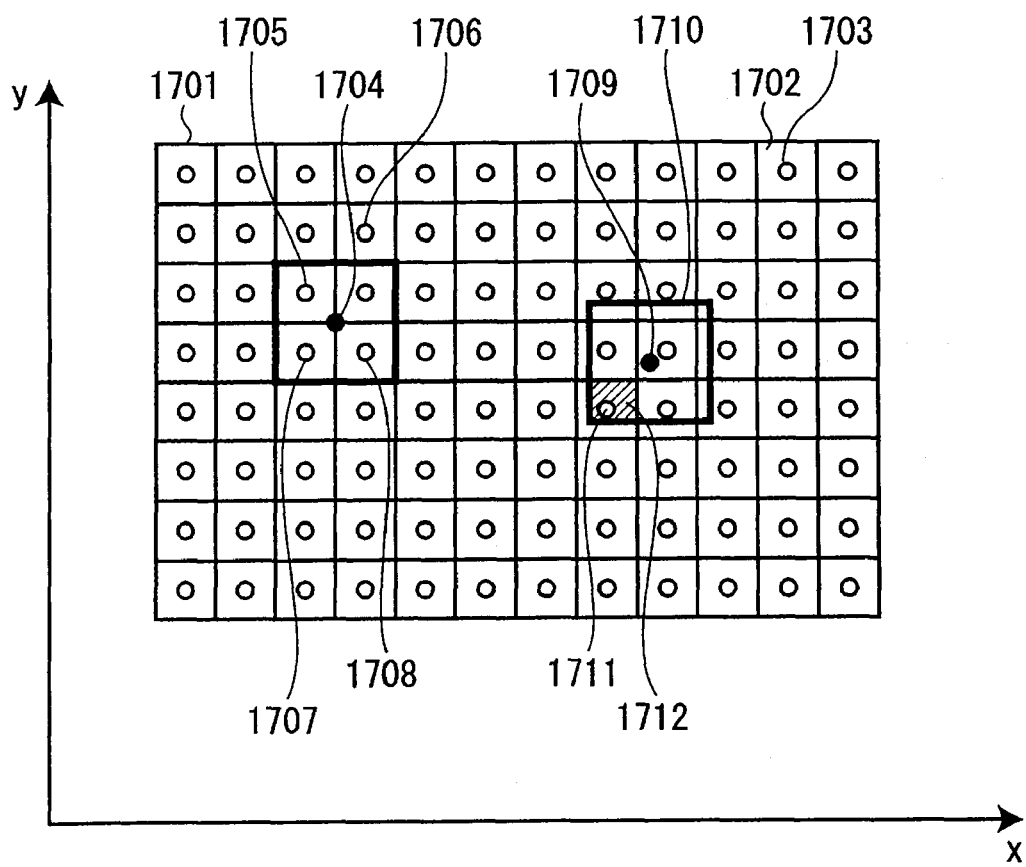
FIG. 18 is a drawing showing a screen, pixels, and squares for explaining a method of calculating a sample value of an initially estimated super-resolution image.

Referring now to FIG. 18, a method of calculating a preliminary sample value will be described.

As shown in FIG. 18, a screen 1701 is divided into a plurality of squares 1702. The pixel values which represent the distribution of the brightness of the respective squares are pixel values 1703 at the centers thereof. The size of the square is determined by the density of the pixels. For example, when the resolution is half in the lateral and vertical direction, the size of the square is doubled in lateral and vertical direction.

In FIG. 18, the pixels of the super-resolution image data are represented by hollow circles, and sample points corresponding to the low-resolution image data of half in resolution are represented by solid circles.

When the pixel values of the initially estimated super-resolution image are applied to the pixels of the super-resolution image data, the sample value of the initially estimated super-resolution image at a sample point 1704 is calculated as an average value of the pixel values of pixels from 1705 to 1708. This is a case in which the sample point 1704 is located at the center of the pixels of the super-resolution image data therearound.

When the position is displaced as a sample point 1709, the weighted average of the portion overlapped by a square 1710 which is represented by the sample point is determined as the sample value of the initially estimated super-resolution image. For example, the weight with respect to a pixel 1711 is determined by converting the surface area of a hatched portion 1712 into a weight. Nine squares overlapped with the square 1710 are weight so as to be proportional to the overlapped surface area, and then the weighted average is obtained from the nine pixel values as a sample value of the initially estimated super-resolution image.

If the super-resolution image data is accurate, the sample value imaged as the low-resolution image data should match the sample value of the initially estimated super-resolution image.

However, they do not match normally. Therefore, the pixel value of the initially estimated super-resolution image is renewed so as to match. The difference between the sample value and the preliminary sample value is obtained, and the difference is added to or subtracted from the pixel value of the initially estimated super-resolution image to eliminate the difference. Since there is a plurality of pixel values, the difference is divided by the weight used in sampling, and is added to or subtracted from each pixel value. Accordingly, the sample value and the sample value of the initially estimated super-resolution image matches as regards the sample point calculated at this time. In the renewal processing on another sample point, however, the pixel data of the same super-resolution image may be renewed. Therefore, this renewal process is repeated several times for every sample point. Since the super-resolution image data becomes closer to the accurate one gradually by this repetition, the image obtained after the repetition by the predetermined number of times is outputted as the super-resolution image data.

In this manner, one of the methods of obtaining the pixel value of the super-resolution image data by solving the conditional expression with the pixel value of the super-resolution image data used as an unknown value, which gives a condition that the sample value of the estimated super-resolution image obtained from the unknown value to be equal to the sample value by the pixel value of the actually imaged low-resolution image data is the POCS method, and Iterative Back-Projection method (for example, see S. Park, et. al, "Super-Resolution Image Reconstruction: A Technical Overview" p. 31) or MAP method, (for example, see S. Park, et. al, "Super-Resolution Image Reconstruction: A Technical Overview" p. 28) may be used as alternative methods for solving these conditional expressions.

Figure 19:
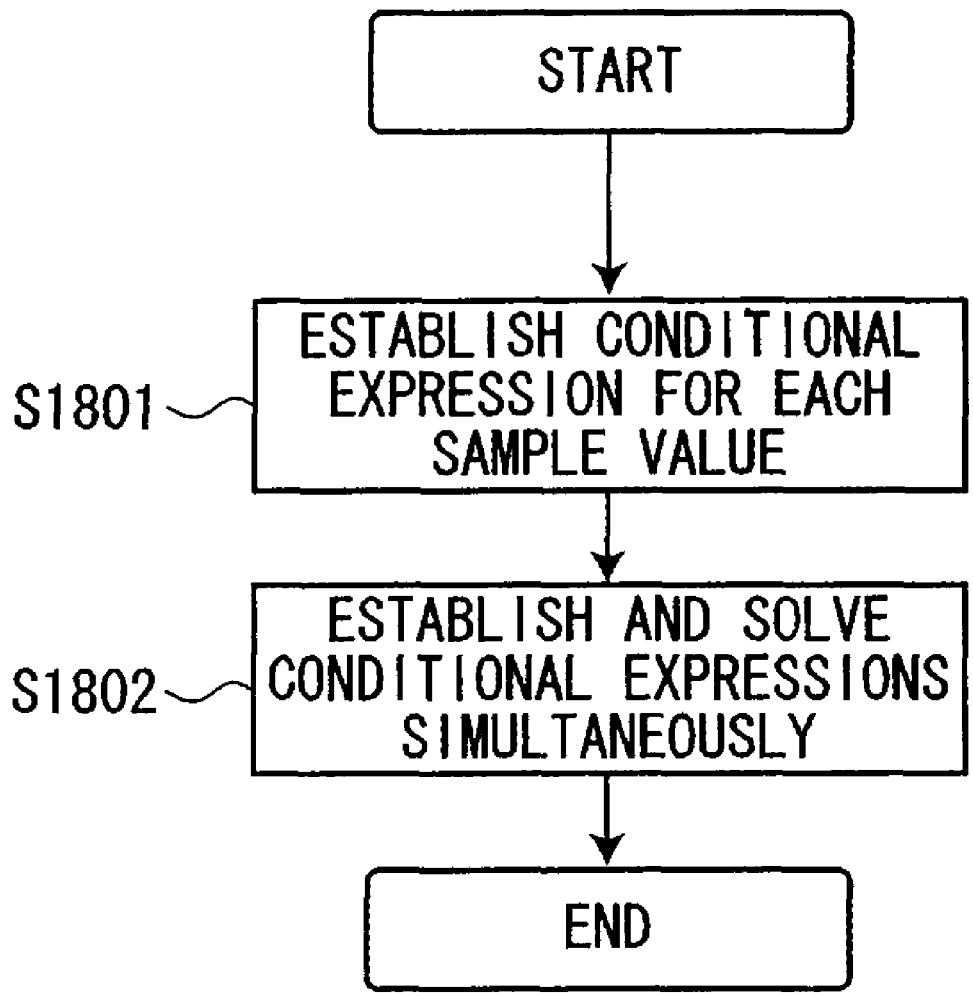
FIG. 19 is a flowchart showing an example of the operation for super-resolution by establishing conditional expressions for each sample value.

FIG. 19 is a flowchart for establishing the conditional expressions for the super-resolution.

As shown in FIG. 19, in Step S1801, the above-described conditional expressions are established for the pixels of the low-resolution image data, that is, for the respective sample values.

Subsequently, in the Step S1802, the pixel value of the super-resolution image data is obtained by solving the conditional expressions as the simultaneous equations.

Figure 20:
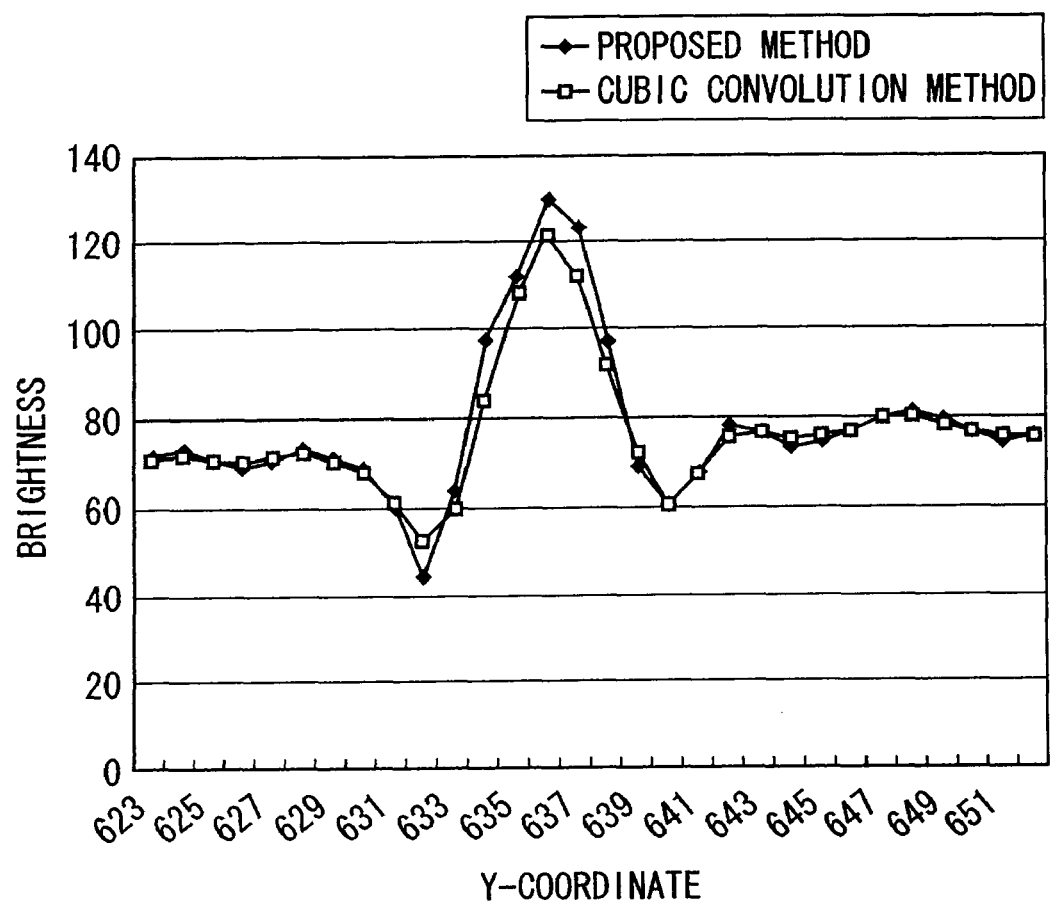
FIG. 20 is a drawing showing a relation between the positional coordinate and the brightness after the super-resolution.

FIG. 20 shows a state of the brightness value of a certain line in super-resolution images obtained by applying the cubic convolution method in the related art and the method according to this embodiment to a certain still image. The lateral axis represents the pixel, and the vertical axis represents the brightness value. This is an enlargement of a portion of a white line in a large light-and-shade image.

As will be seen in FIG. 20, the darkness is emphasized in the dark portion indicated by 633 in the y-coordinate, and the brightness is emphasized in the bright portion indicated by 637 in the y-coordinate.

What is claimed is:

1. A super-resolution device, comprising:
    a candidate area setting unit configured to set
        at least one of a plurality of pixels included in image data as a target pixel, the image data including the plurality of pixels arranged in a screen and corresponding pixel values representing pixel brightness,
        an area including the target pixel and pixels in the periphery of the target pixel as a target pixel area within the screen, and
        a search area for searching a plurality of change patterns of pixel values of the pixels included in the target pixel area within the screen;
    a matching difference calculating unit configured to calculate at least one difference between
        a first change pattern of the pixel values of the pixels included in the target pixel area, and
        a second change pattern of the pixel values of the pixels included in the search area, said pixels included in the search area including a searched pixel and the pixels in the periphery of the searched pixel;
    a difference comparing unit configured to compare at least one difference between the first and second change patterns to obtain a first pixel position with a first minimum difference and a second pixel position in a periphery of the first pixel position with a second difference thereof;
    a memory configured to store the first pixel position and the first minimum difference thereof, the second pixel position and the second difference thereof;
    a decimal-accuracy-vector calculating unit configured to calculate a position with a minimum difference in the search area with a decimal accuracy on the basis of the first pixel position and the first minimum difference, and the second pixel position and the second difference stored in the memory, and to calculate a decimal-accuracy-vector starting from the target pixel and terminating at the position with the minimum difference;
    an extrapolated vector calculating unit configured to calculate an extrapolated vector of the decimal-accuracy-vector from the position with the minimum difference to a pixel on the screen which is not included in the search area using the decimal-accuracy-vector; and
    a super-resolution pixel value calculating unit configured to calculate a pixel value of a super-resolution image having a number of pixels larger than a number of pixels included in the image data on the basis of the decimal-accuracy-vector, the extrapolated vector, and pixel values obtained from the image data.

2. A super-resolution device, comprising:
a candidate area setting unit that configured to set
at least one of a plurality of pixels included in image data as a target pixel, the image data including the plurality of pixels arranged in a screen and corresponding pixel values representing pixel brightness,
an area including the target pixel and pixels in the periphery of the target pixel as a target pixel area within the screen, and
first and second search areas for searching a plurality of change patterns of pixel values of the pixels included in the target pixel area within the screen;
a matching difference calculating unit configured to calculate first and second differences between a first change pattern of the pixel values of the pixels included in the target pixel area and first and second change patterns of pixel values of the pixels included in the first and second search areas, the pixels included in the first and second search areas including first and second searched pixels and pixels in the periphery of the first and second searched pixels;
a difference comparing unit configured to compare differences of the first and second change patterns to obtain first and second pixel positions with first and second minimum differences and a third pixel position in the periphery of the first searched pixel with a third difference thereof and a fourth pixel position in the periphery of the second searched pixel with a fourth difference thereof;
a memory configured to store the first pixel position and the first minimum difference thereof, the second pixel position and the second minimum difference thereof, the third pixel position and the third difference thereof, the fourth pixel position and the fourth difference thereof calculated by the difference comparing unit;
a decimal-accuracy-vector calculating configured to calculate a position with a minimum difference in the first and second search areas with a decimal accuracy on the basis of the first pixel position and the first difference thereof, the second pixel position and the second difference thereof, the third pixel position and the third difference thereof, and the fourth pixel position and the fourth difference thereof stored in the memory, and calculate a first decimal-accuracy-vector and a second decimal-accuracy-vector starting from the target pixel and terminating at the position with the minimum difference;
an interpolated vector calculating unit configured to calculate an interpolated vector of the first and second decimal-accuracy-vectors from the position with the minimum distance to a pixel on the screen which is not included in the first and second search areas using the first and second decimal-accuracy-vectors; and
a super-resolution pixel value calculating unit configured to calculate a pixel value of a super-resolution image having number of pixels larger than the number of pixels included in the image data on the basis of the decimal-accuracy-vector, the interpolated vector and pixel values obtained from the image data.

3. A super-resolution device comprising:
a candidate area setting unit configured to set
at least one of a plurality of pixels included in image data as a target pixel, the image data including the plurality of pixels arranged in a screen and corresponding pixel values representing pixel brightness,
an area including the target pixel and pixels in the periphery of the target pixel as target pixel area within the screen, and
a search area for searching a plurality of change patterns of pixel values of the pixels included in the target pixel area within the screen;
a matching difference calculating unit configured to calculate a difference between a first change pattern of pixel values of pixels included in the target pixel area and a second change pattern of pixel values of pixels included in the search area, the pixels included in the search area including a searched pixel in the search area and the pixels in the periphery of the searched pixel;
a difference comparing unit configured to compare at least one difference between the first and second change patterns to obtain a first pixel position with a first minimum difference and a second pixel position in a periphery of the first pixel position and a second difference thereof;
a memory configured to store the first pixel position and the first minimum difference thereof, the second pixel position and the second difference thereof calculated by the difference comparing unit;
a decimal-accuracy-vector calculating unit configured to calculate a position with a minimum difference in the search area with a decimal accuracy on the basis of the first pixel position and the first minimum difference thereof and the second pixel position and the second difference thereof stored in the memory, and calculate a decimal-accuracy-vector starting from the target pixel and terminating at the position with the minimum difference;
a congruent vector calculating unit configured to calculate a congruent vector of the decimal-accuracy-vector from the position with the minimum difference to a pixel on the screen which is not included in the search area using the decimal-accuracy-vector; and
a super-resolution pixel value calculating unit configured to calculate a pixel value of a super-resolution image having number of pixels larger than number of pixels included in the image data on the basis of the decimal-accuracy-vector, the congruent vector, and pixel values obtained from the image data.

4. A super-resolution method, comprising:
setting at least one of a plurality of pixels included in an image data as a target pixel, the image data including the plurality of pixels arranged in a screen and corresponding pixel values representing brightness,
setting an area within the screen including the target pixel and pixels in the periphery of the target pixel as a target pixel area,
setting a search area for searching a plurality of change patterns of the pixel values of the pixels included in the target pixel area within the screen;
calculating a difference between a change pattern of pixel values of pixels included in the target pixel area and a change pattern of pixel values of pixels included in the search area, the pixels in the search area including a searched pixel in the search area and pixels in the periphery of the searched pixel;
comparing differences of the change patterns of the respective pixels in the search area to obtain a first pixel position with a minimum difference and a second pixel position in the periphery of the first pixel with a second difference thereof;

storing the first pixel position and the first difference thereof, the second pixel position and a second difference thereof;

calculating a position with a minimum difference in the search area with a decimal accuracy on the basis of the first pixel position and the first difference thereof and the second pixel position and the second difference thereof, and calculating a decimal-accuracy-vector starting from the target pixel and terminating at the position with the minimum difference;

calculating an extrapolated vector of the decimal-accuracy-vector from the position with the minimum distance to a pixel on the screen which is not included in the search area using the decimal-accuracy-vector; and calculating a pixel value of a super-resolution image having a number of pixels larger than a number of pixels included in the image data on the basis of the decimal-accuracy-vector, the extrapolated vector, and pixel values obtained from the image data.

5. A super-resolution method, comprising:

setting at least one of a plurality of pixels included in an image data as a target pixel, the image data including the plurality of pixels arranged in a screen and corresponding pixel values representing the pixel brightness, setting an area including the target pixel and pixels in the periphery of the target pixel as a target pixel area, setting first and second search areas for searching a plurality of change patterns of the pixel values of the pixels included in the target pixel area within the screen;

calculating first and second differences between a change pattern of the pixel values of the pixels included in the target pixel area and first and second change patterns of pixel values of pixels included in the first and second areas, the pixels included with the first and second areas including the first and second searched pixels in the first and second search areas and pixels in the periphery of the first and second searched pixels;

comparing differences of the first and second change patterns of the respective pixels in the first and second search areas to obtain first and second pixel positions with a minimum difference, a third pixel position in the periphery of the first pixel with a third difference and a fourth pixel position in the periphery of the second pixel with a fourth difference by a difference comparing unit;

storing the first pixel position and the first difference thereof, the second pixel position and the second difference thereof, the third pixel position and the third difference thereof, the fourth pixel position and the fourth difference thereof calculated;

calculating a position with the minimum difference in the first and second search areas with a decimal accuracy on the basis of the first pixel position and the first difference thereof, the second pixel position and the second difference thereof, the third pixel position and the third difference thereof, and the fourth pixel position and the fourth difference thereof stored in the memory, and calculating a first decimal-accuracy-vector and a second decimal-accuracy-vector starting from the target pixel and terminating at the position with the minimum difference;

calculating an interpolated vector of the first and second decimal-accuracy-vectors from the position with the minimum distance to a pixel on the screen which is not included in the first and second search areas by using the first and second decimal-accuracy-vectors; and calculating the pixel value of the super-resolution image having a number of pixels larger than a number of pixels included in the image data on the basis of the decimal-accuracy-vector, the interpolated vector and pixel values obtained from the image data.

6. A super-resolution method comprising:

setting at least one of a plurality of pixels included in image data as a target pixel, the image data including the plurality of pixels arranged in a screen and pixel corresponding values representing pixel brightness, setting an area including the target pixel and pixels in the periphery of the target pixel as a target pixel area, setting a search area for searching a plurality of change patterns of the pixel values of the pixels included in the target pixel area within the screen;

calculating a difference between the change pattern of the pixel values of the pixels included in the target pixel area and the change pattern of the pixel values of the pixels included in the search area, the pixels included in the search area including the searched pixel in the search area and the pixels in the periphery of the searched pixels for the respective pixels in the search area;

comparing differences of the change patterns of the respective pixels in the search area calculated by the matching difference calculating unit to obtain a first pixel position with a minimum difference by a difference comparing unit;

storing the first pixel position and a first difference thereof, a second pixel position in the periphery of the first pixel and a second difference thereof in a memory;

calculating a position with the minimum difference in the search area with a decimal accuracy on the basis of the first pixel position and the first difference thereof and the second pixel position and the second difference thereof stored in the memory, and calculating a decimal-accuracy-vector starting from the target pixel and terminating at the position with the minimum difference;

calculating a congruent vector of the decimal-accuracy-vector from the position with the minimum difference to a pixel on the screen which is not included in the search area using the decimal-accuracy-vector; and calculating a pixel value of a super-resolution image having a number of pixels larger than a number of pixels included in the image data on the basis of the decimal-accuracy-vector, the congruent vector, and pixel values obtained from the image data.

* * * * *